Oct. 16, 1962     O. B. HARMES ET AL     3,058,668
CLEANING APPARATUS
Filed Oct. 7, 1960     4 Sheets-Sheet 1
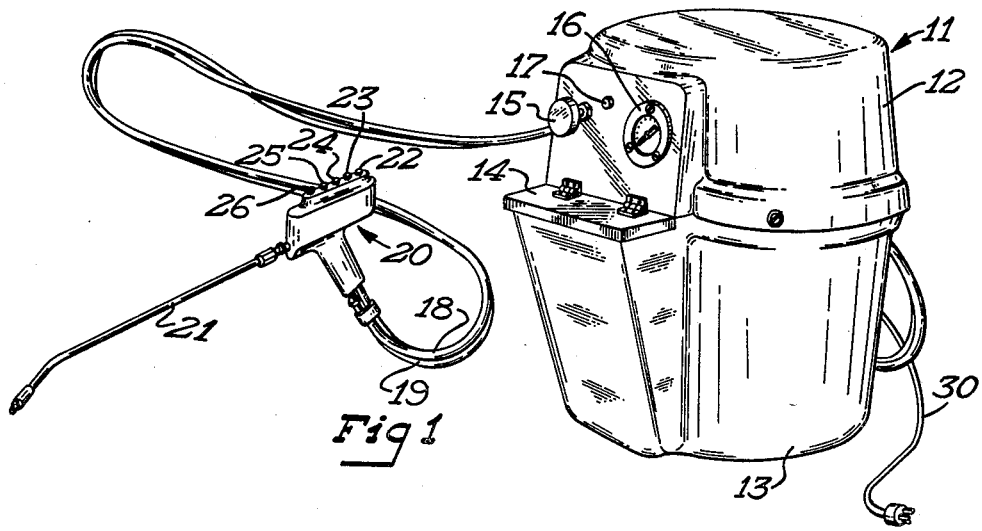
Fig 1
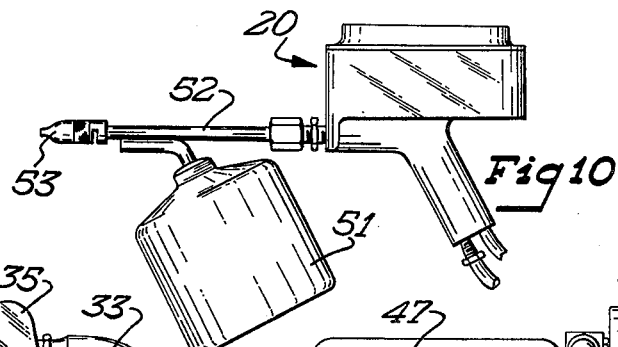
Fig 10
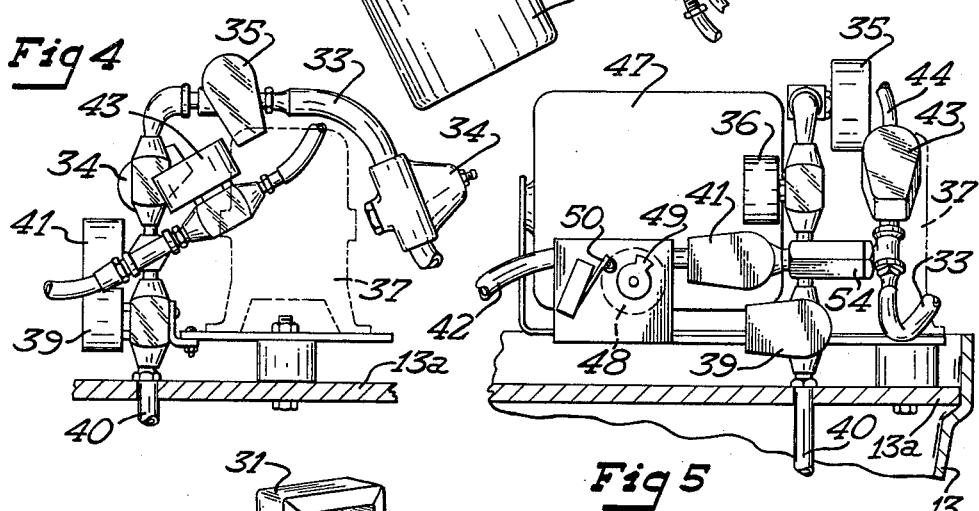
Fig 4
Fig 5
Fig 6
INVENTORS
OREN B. HARMES,
JOHN H. THRELKELD,
DONALD A. DEAL
BY
Everett J. Schroeder
ATTORNEY Oct. 16, 1962   O. B. HARMES ET AL   3,058,668
CLEANING APPARATUS
Filed Oct. 7, 1960   4 Sheets-Sheet 2

INVENTORS
OREN B. HARMES,
JOHN H. THRELKELD,
DONALD A. DEAL
BY Everett J. Schroeder
ATTORNEY

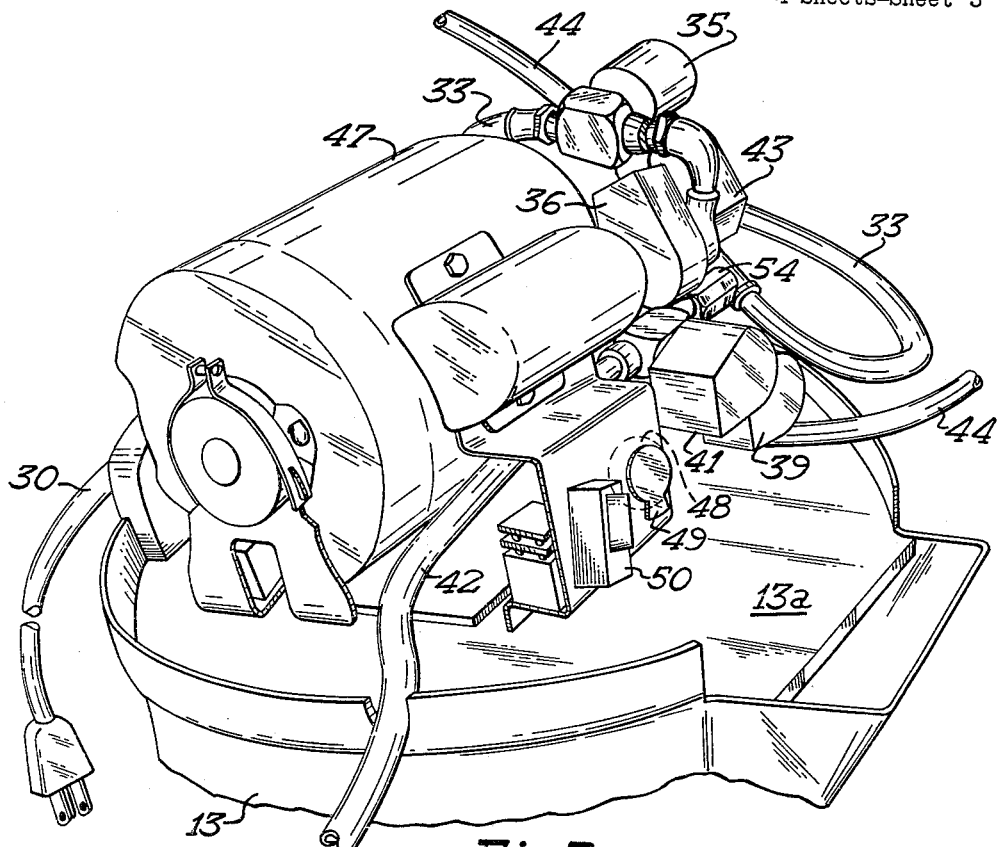
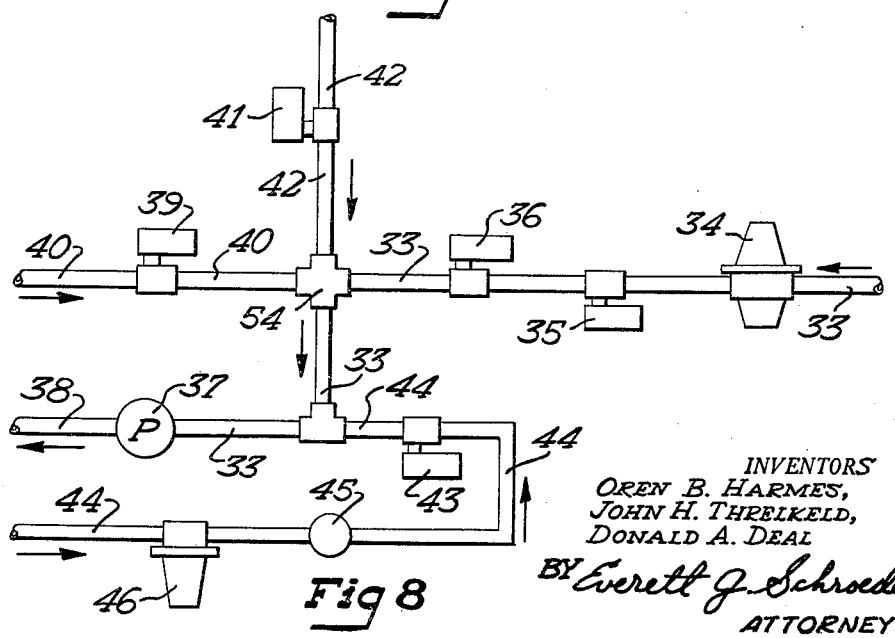

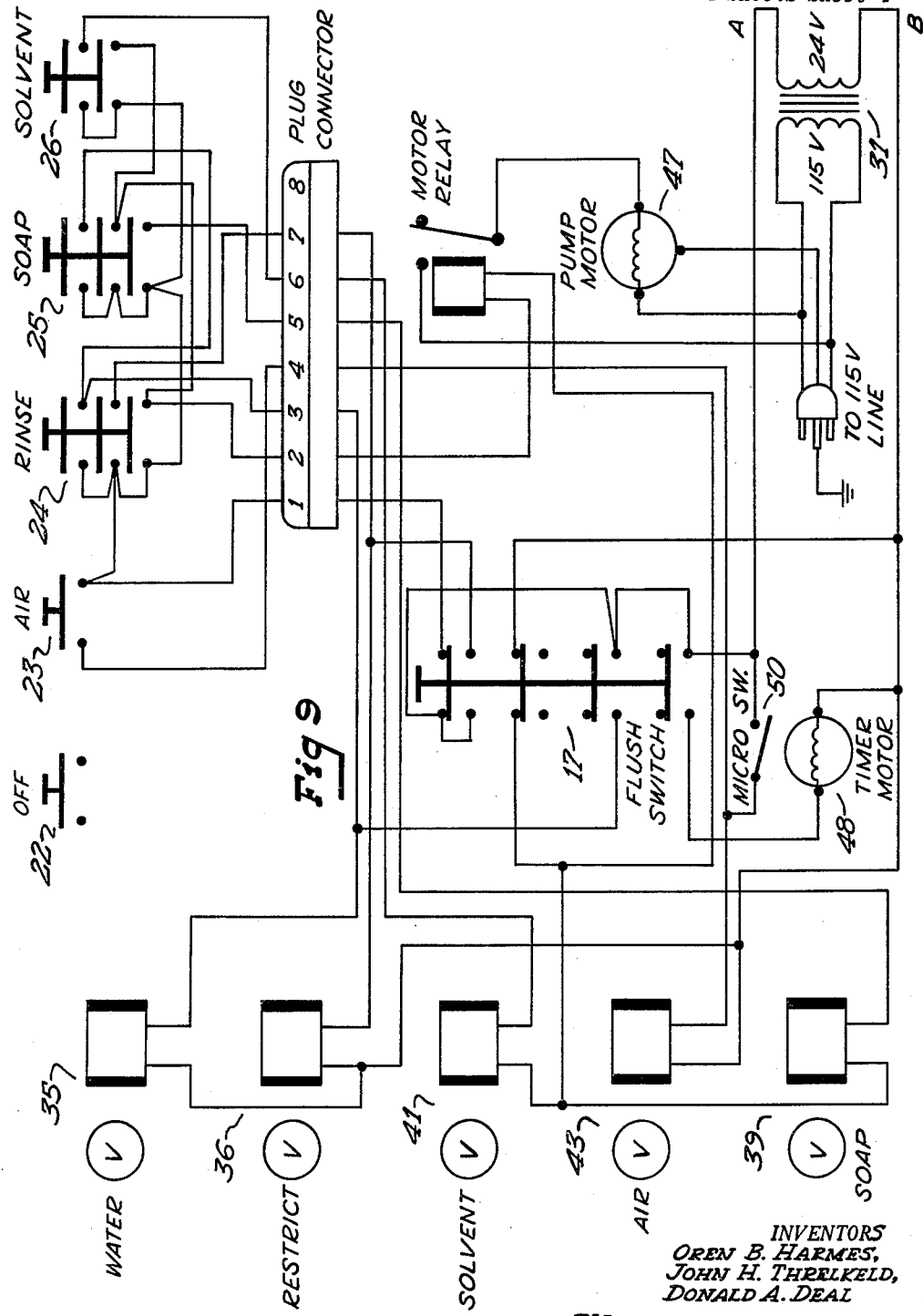

United States Patent Office 3,058,668
Patented Oct. 16, 1962

3,058,668
CLEANING APPARATUS
Oren B. Harmes, Algona, John H. Therlkeld, Britt, and Donald A. Deal, Algona, Iowa
Filed Oct. 7, 1960, Ser. No. 61,316
19 Claims. (Cl. 239—305)

This invention relates to cleaning apparatus. More particularly, it relates to devices for cleaning items such as automobiles and machinery which are laden with grease, oil, etc., upon the exterior of their motors and their working as well as non-working parts.

It is conventional to clean automobile engines and other machinery of oil, grease and dirt through the use of pressurized steam. Such a cleaning operation is expensive, inconvenient, and time-consuming as well as dangerous. Our cleaning apparatus is designed to overcome these and other disadvantages of such cleaning devices as are heretofore known.

It is a general object of our invention to provide novel and improved cleaning apparatus of simple and inexpensive construction and operation.

A more specific object is to provide novel and improved cleaning apparatus which is highly effective in its cleaning operation, is simple and inexpensive to operate, and has a high degree of flexibility and adaptability for cleaning various surfaces.

Another object is to provide highly effective cleaning apparatus capable of utilizing cold water and yet performing a remarkably efficient cleaning operation.

Another object is to provide a highly effective cleaning apparatus which is quickly and readily adjustable to perform a multiplicity of cleaning operations associated with automobiles and the like.

Another object is to provide novel and improved highly efficient cleaning apparatus which permits the operator to perform a multiplicity of cleaning operations and rinsing operations consecutively, and/or interchangeably, with an absolute minimum of inconvenience and time consumption.

Another object is to provide novel and improved highly efficient cleaning apparatus in which the cleaning and rinsing operation are instantly interchangeable and/or attainable by the operator without returning to the main body of the apparatus.

Another object is to provide novel and improved cleaning apparatus which is highly efficient and in which the cleaning and rinsing and flushing operations are readily interchangeble and controllable at the point of application and removed from the main body of the apparatus, thereby permitting the operator maximum freedom and efficiency in performing the cleaning operation.

Another object is to provide novel and improved cleaning apparatus in which the standard facilities of a service station may be utilized to provide a highly efficient cleaning device at a substantial saving and to avoid a substantial cash outlay for non-standard facilities such as a steam supply.

Another object is to provide novel and improved cleaning apparatus in which the solvent, soap, and rinse water are all discharged from the same applicator and are introduced thereinto by the mere flick of a switch by the operator at the point of the cleaning operation.

These and other objects and advantages of our invention will more fully appear from the following description, made in connection with the accompanying drawings, wherein like reference characters refer to the same or similar parts throughout the several views, and in which:

FIG. 1 is a perspective view of our cleaning apparatus with the housing encasing the same and with an elongated spray nozzle attached to the cleaning gun.

FIG. 4 is a diagrammatic right side elevational view, partially sectioned, illustrating the relative positions of the various valves of the main body of the working mechanism.

FIG. 5 is a fragmentary front elevational view of the main body of the working mechanism, the housing having been removed and part of the tank being shown in section.

FIG. 6 is a fragmentary perspective view of the inlet and outlet portion of the main body of the mechanism as viewed from the front.

FIG. 7 is a left side fragmentary perspective view of the main body of the working mechanism, the top portion of the casing having been removed and the lower portion being broken away.

FIG. 8 is a diagrammatic view of the system by means of which the operation of the cleaning apparatus is controlled.

FIG. 9 is a schematic wiring diagram of the cleaning apparatus and

FIG. 10 is a side elevation view of the gun portion of the apparatus with a cleaning foam applicator attachment secured thereto.

Figure 2:
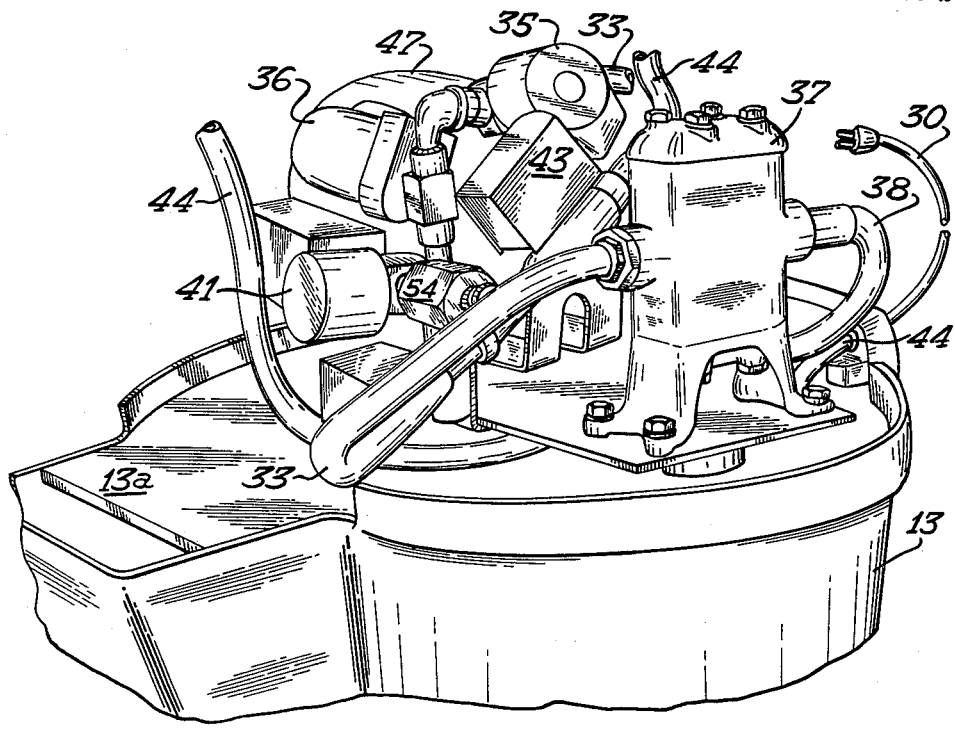
FIG. 2 is a right hand side elevational view with portions thereof broken away and with the top portion of the housing removed, showing the main body of the working mechanism of the apparatus.
Figure 3:
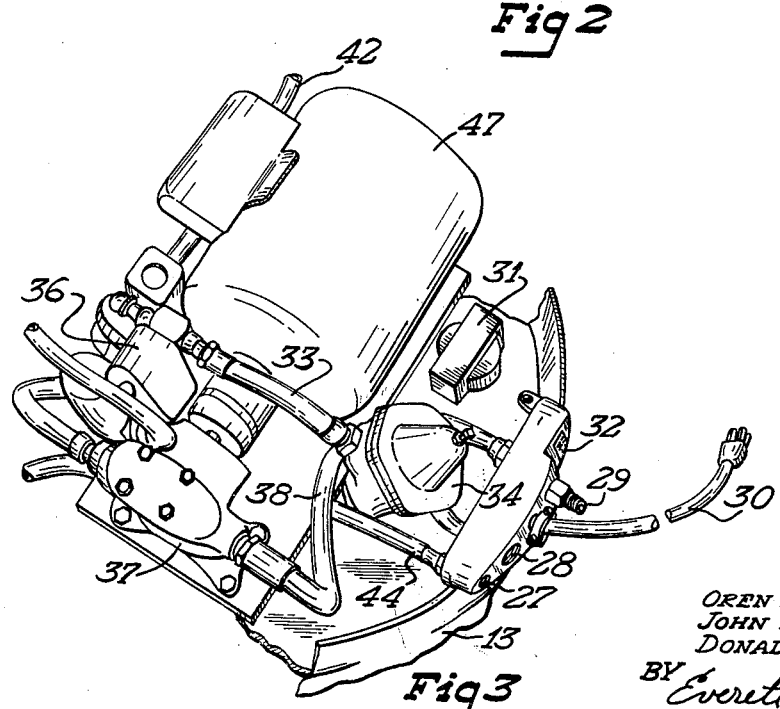
FIG. 3 is a fragmentary plan view of the main body of the working mechanism, the top portion of the housing having been removed.

One embodiment of our invention, as shown in FIGS. 1–10 inclusive, includes a housing indicated generally by the numeral 11, having an upper portion 12 which functions as a cover and a lower portion 13 which is comprised of a tank having a filler opening covered by the hinged lid 14. Extending across the upper portions of the tank 13 is a support plate 13a upon which the main body of the mechanism of the cleaning apparatus is supported.

Mounted on the front panel of the cover member 12 is an air pressure control knob 15, an air pressure gauge 16 and a flush switch 17. Extending forwardly from the rear portion of the housing 11 is a liquid line 18 and, an electrical line 19 each of which run parallel to each other and are connected along their length and terminate in a gun indicated generally by the numeral 20. The gun 20 carries an elongated spray nozzle 21 which provides a flat spray of a type well-known in the art.

The gun 20 is comprised of a casing shaped somewhat to resemble a pistol and housing a battery of switches which enables the operator to control the cleaning apparatus from a remote position to effect a substantial saving in time, effort and convenience. As best shown in FIG. 1 a plurality of switch buttons extend upwardly from the upper surface of the gun. The numeral 22 indicates the off button, the numeral 23 indicates the air button, the numeral 24 indicates the rinse button, the numeral 25 indicates the soap button and numeral 26 indicates the solvent button. The off button 22, when depressed, disconnects all of the remaining switches. The air button 23, when depressed closes the circuit to the air valve to be hereinafter described. The rinse button 24, when depressed activates the pump and energizes the water and restrictor valve each of which will be hereinafter described. The soap button 25, when depressed, actuates the pump and energizes the water and soap valve, each of which will be hereinafter described. The solvent button 26, when depressed activates the pump and energizes the solvent valve which will be identified and described hereinafter. All of these switches 22–26 inclusive are interconnected mechanically. Each of the switches, when depressed is mechanically connected to the other switches in such a manner as to release all of the switches previously depressed except those which are intended to remain open to perform the desired operation. The off switch 22 releases all of the other switches.

At the back of the housing 11, as best shown in FIG. 6, there is a compressed air inlet 27 and a water inlet 28, the latter of which is to be connected to a source of water under pressure (not shown). A water discharge outlet 29 also extends outwardly from the housing 11 as shown in FIG. 6 and this outlet is adapted to be connected to the liquid line 18. An electrical lead line 30 is connected to a step-down transformer 31 which reduces the voltage from 115 volts to 24 volts for the purposes of safety. A socket 32 is also provided for reception of a plug carried by the electrical line 19 which extends to the gun 20.

Referring now to FIG. 8 in order to describe the relation of the various parts most clearly, there is shown in this figure a main line or conduit 33 within which there is interposed a plurality of various solenoid valves. This main line or conduit 33 is connected to a source of water under pressure which is not shown. The conventional city water line normally available in service stations is satisfactory for use. Interposed within the main line 33 is a water regulator 34 which regulates the pressure of the water as it is applied to the remainder of the line to the left of the regulator as viewed in FIG. 8. Also interposed within the conduit 33 is the water valve 35 which when open permits the water to flow freely through the conduit 33 and which, when closed, cuts off the complete flow of water through this line or conduit.

Also interposed within the conduit 33 is a water restrictor valve 36. The restrictor valve 36 has a small by-pass hole drilled through the body of the valve which permits a restricted flow of water to pass through this valve even though the valve is in closed position. When the restrictor valve is in open position, then, of course, the water is free to flow through the conduit 33 at will assuming, of course, that the valve 35 is also open.

The main conduit 33 extends from the restrictor valve 36 to the pump 37. This pump is of the positive action piston type which when operated will induce substantial suction at its intake side if an inadequate supply of liquid is provided thereat. The pump 37 has a discharge conduit 38 connected thereto and this discharge conduit is connected with a discharge outlet 29 shown in FIG. 6. The pump 37 discharges water under a pressure of approximately 600 p.s.i. and is provided with a release valve in the form of a spring urged needle valve to prevent greater pressures from being generated.

A soap valve 39 is connected by a soap conduit 40 with the main conduit 33 as best shown in FIG. 8. The portion of the conduit 40 as viewed at the left hand side of FIG. 8 extends into the tank 13 for its supply of soap. A solvent valve 41 is also connected to the main conduit 33 by a solvent conduit 42, the upper portions of which as viewed in FIG. 8 is connected with a source of solvent (not shown).

Also connected to the main conduit 33 in fluid communicating relationship similar to the manner in which the solvent valve 41 and soap valve 39 are connected is an air valve 43. This valve 43 is connected by a conduit 44 to the main conduit 33 and is also connected thereby to the air pressure gauge 45 and the air pressure regulator 46. The portion of the conduit 44 at the lower left hand corner of FIG. 8 which is shown as broken extends to the supply of compressed air (not shown). The supply of compressed air which may be utilized may be the conventional supply of compressed air which is ordinarily available at service stations. A motor 47 is supported by the support plate 13a and is connected in driving relation with the pump 37. The motor 47 is an electric motor and is provided with a source of electrical power in the conventional manner. A timer motor 48 is also supported by the support plate 13 and carries a rotary cam element 49 which rotates therewith. The timer motor 48 is of the type which requires approximately 20 seconds to complete one revolution of its drive shaft and of the cam 49. The cam 49 is designed to engage and close a switch element 50 which is best shown in FIG. 5. This switch 50 is connected to the air valve 43 and closes the current to that valve when engaged by the cam 49.

Each of the valves 35, 36, 39, 41, and 43 are of the solenoid type wherein the valve element is urged by a light spring and the pressure of the fluid being regulated thereby toward a closed position. The solenoid lifts the valve element or piston to open the valve when the solenoid is energized.

FIG. 10 shows the gun 20 bearing a separate attachment for use in the cleaning of fabrics such as automobile seats etc. A cleaner of the foam type is contained within the container 51 and is supported by the air line 52 which carries a spray nozzle 53 at its outer end.

FIG. 9 is a schematic wiring diagram which is used in our invention. The various valves have been indicated by proper legends thereon and, in view of the prior discussion of the function of the various switches which have also been indicated by proper legend, it is not believed that further discussion and explanation is required. The sole exception is the flush switch 17 which, as shown in FIG. 9, functions when in Off position to energize the lead wire from the transformer to the multi-socket 32 and the wire running from the transformer 31 to the soap valve 39 and the solvent valve 41. When the flush switch 17 is moved to On position it breaks the circuit to the soap valve 39 and solvent valve 41 and energizes the restrictor valve 36 and water valve 35 as well as the timer motor 48. We break the circuit on the soap and solvent valves as well as the motor relay during the flush operation in order to make the buttons of the gun 20 inoperable. This makes it impossible to accidently leave the flush switch 17 on during washing operation.

When it is desired to wash a surface such as the exterior of an automobile the tank 13 is partially filled with the wash powder or liquid soap and the spray tip is removed. The gun barrel is then inserted into the soap tank and the rinse button 22 is pushed and maintained in closed position until the tank 13 is approximately three-fourths full. The off button 22 is then pushed and the tip 21 is replaced. The device is then ready for cleaning the exterior of the automobile. In applying the soap the operation should be fairly rapid and the main purpose is to get a uniform application of soap upon the exterior and then given the soap an opportunity to perform its cleaning function. To apply the soap the rinse button is pushed until the pressure comes up and then the soap button is pushed. Pushing the soap button continues to operate the pump and opens the soap valve 39 and the water valve 35. It will be noted that the restrictor valve 36 remains closed. This causes the pump 37 to be partially starved with the result that the soap is sucked out of the tank 13 and discharged through the spray nozzle 21 after having been mixed with the restricted supply of water which flows through the restrictor valve 36.

After soap has been applied uniformly to the exterior of the automobile the rinse button is pushed in order to rinse off the dirt and soap. Pressing the rinse button energizes the pump and opens the water valve 35 and the restrictor valve 36. This means that a fully supply of water is applied to the pump and the rinsing operation can be performed quickly and efficiently. The flat spray provided by the nozzle 21 is used as a "water broom" so as to sweep the soap progressively from the surface, keeping the soap moving ahead and away from the rinsed area.

If an engine is to be cleaned, or a piece of machinery which is laden with grease or similar material, the solvent conduit is connected with a source of concentrated grease solvent mixed with 12–14 parts of kerosene, distillate, or diesel fuel. To ready the apparatus for use the spray tip 21 is removed and the solvent button on the gun is pressed to clear the lines. When the lines are filled with solvent the off button is pushed and the spray tip 21 is replaced. Thereafter the solvent button is pressed and, as indicated previously, this functions to start the pump 37 and to open the solvent valve 41. The suction created by the operation of the pump 37 causes the grease solvent to be drawn into the pump and forced outwardly under high pressure through the spray nozzle 21. When the engine or machine has been completely sprayed the spray action is stopped by pressing the off button and the solvent is given sufficient time to penetrate and emulsify the grease and grime. This usually requires approximately 15–20 minutes. We then remove the spray tip and push the rinse button in order to clear the line of solvent. The spray tip 21 is then reapplied and we press the rinse button which starts the pump and opens the water valve 35 and the restrictor valve 36. When operating pressure is reached we push the soap button which closes the restrictor valve and opens the soap and water valve to cause soap to be sucked into the pump and applied to the motor, engine or machine. When the soap has been thoroughly applied to the motor, engine or machine we press the rinse button which opens both the water valve and the restrictor valve and enables us to wash the engine free of solvent, soap, grease, grime, etc.

Our cleaning apparatus can also be used to flush the cooling system of an automobile. To accomplish this we provide a heat exchange adapter (not shown) which is threaded into the heat indicator plug opening of the automobile and to which a conventional water hose may be attached. The other end of the hose is attached to the water discharge outlet 29 of our apparatus so that the water which is discharged by the pump 37 will be driven through the radiator of the automobile in a reversed direction to flush the interior of the radiator and wash it free of rust and other undesirable solids. A cooling system cleaner may be inserted in the radiator in accordance with directions provided on the containers therefore prior to filling the radiator with water. We have found that the cleaning or flushing operation is aided if the engine temperature is maintained relatively high but insufficiently high to boil the cleaning fluid. We have provided a special radiator cap (not shown) which permits the water to escape through the overflow pipe of the radiator.

We have found that during the flushing operation a substantially more efficient flushing operation can be accomplished by periodically injecting a surge of air under pressure into the flow of water which enters the heat indicator plug opening through the hose. This is accomplished by pressing the flush switch 17 which activates the timer motor 48. As indicated previously the timer motor 48 makes a complete revolution with the cam 49 every 20 seconds. The size of the cam 49 is such that it engages a switch 50 approximately 2.5 seconds with the net result that the air valve 43 is opened approximately 2.5 seconds of every 20 seconds. This results in a surge of compressed air into the flow of water and is very effective in causing churning and surging within the water to more effectively loosen rust, etc.

When we desire to use our apparatus for cleaning upholstery of an automobile we replace the spray nozzle 21 with the element 52 to connect the container 51 to the gun 20. The air button 23 is then pressed to activate the air valve 43 and cause compressed air to be forced through the spray nozzle 53 whereupon an application of a foam cleaner may be applied to the upholstery, assuming of course that a supply of upholstery cleaner mixture has been previously inserted in the container 51. We utilize an air pressure of 100 p.s.i. for this operation and this may be provided by regulation of the air pressure regulating knob 15. The spray pattern may be adjusted by turning the tip of the spray nozzle 53. After the cleaner has been applied we utilize a stiff brush and lightly brush the entire surface. On rap-type material we allow the cleaner to dry and then vacuum the soil loosened by the cleaner. On vinyl or plastic material we wipe the material dry with a clean cloth or turkish towel while the upholstery cleaner is still damp.

The lines 18 and 19 are each preferably approximately 25 feet long so that the operator may move freely around an automobile in performing the cleaning operation or the degreasing operation. It will be noted that the operator has complete control of the entire apparatus at a point well removed from the apparatus and that he may vary the operation of the device in any manner in which he pleases. Moreover, he may switch from one operation to another as desired without returning to the pump area or the area of the valves. In this regard it will be noted that the valves and the pump are all centralized in a relatively remote area relative to the operator while the switches are all centrally located with respect to the operator.

In order to prevent air from rushing back into the water we utilize a check valve indicated by the numeral 54 in FIG. 5.

The size of the opening in the restrictor valve 36 (the by-pass orifice) is related to the size of the orifice on the material being sucked into the main line 33 (the soap or solvent) and to the incoming pressure (as determined by the water regulator) to cause the soap or solvent concentrate to be sucked in, in desired proportions. The approximate proportions vary in accordance with the need of the operator. The incoming pressure of the water can be varied by the pressure regulator 34 to give the proper proportions of the mixture.

From the above it can be seen that we have provided novel and improved cleaning apparatus which is relatively simple and inexpensive in construction and operation. This cleaning apparatus is highly effective and completely obviates the need for steam etc. We have found that this apparatus performs the desired cleaning operation in a superior manner and enables the operator to perform the operation at a considerable less expenditure of time and materials. Moreover, the use of this device is substantially more convenient than apparatus heretofore known and is readily adapted to a multiplicity of usages which enhance its desirabiilty as standard equipment for service stations and the like.

It will, of course, be understood that various changes may be made in the form, details, arrangement and proportions of the parts without departing from the scope of our invention which consists of the matter shown and described herein and set forth in the appended claims.

What is claimed is:

1. Cleaning apparatus comprising a positive action piston type pump having a fluid inlet and a fluid discharge outlet, mechanism for operating said pump to cause the same to take fluids thereinto at its inlet and to discharge such fluid through its discharge outlet, fluid flow directing means connected to said pump outlet for directing the flow of such fluid against a surface to be cleaned, said flow directing means including a movable, flexible tube through which the fluid flows and having a discharge outlet, a source of water under pressure, conduit means connecting said pump inlet and said source of water under pressure in fluid communicating relation, a pressure regulator interposed within said conduit means between said source of water under pressure and said pump inlet, a solenoid water valve interposed within said conduit means between said pressure regulator and said pump inlet for cutting off the flow of such water from said source to said pump when in closed position, a solenoid restrictor valve interposed within said conduit means between said water source and pump inlet for restricting but not closing off the flow of water from said source to said pump when in closed position, a source of compressed air, second conduit means connecting said source of compressed air with said first conduit means in fluid communicating relation at a point between said restrictor valve and said pump, a solenoid air valve interposed within said second conduit means for closing off said second conduit means when in closed position and permittig air to flow into said first mentioned conduit means when in open position, a liquid cleaner tank disposed beneath said pump and supporting the same, third conduit means connecting the interior of said tank with said first conduit means in fluid communicating relation, a solenoid liquid cleaner valve interposed within said third conduit means for preventing liquid cleaner from passing from said tank into said first conduit means when in closed position and permitting such liquid cleaner to pass into said first conduit means when in open position and when said pump is actuated and said restrictor valve is in closed position and said water valve is in open position, a source of grease solvent, fourth conduit means connecting said source of grease solvent with said first conduit means at a point between said restrictor valve and said pump, a solenoid solvent valve interposed within said fourth conduit means for preventing solvent from being drawn into said first conduit means when in closed position and permitting solvent to be drawn into said first conduit means by said pump when in open position with said water valve open and said restrictor valve closed and said pump actuated, centralized portable switch means carried by said flow directing means adjacent its discharge outlet and remote from said pump and movable with said tube, said switch means being electrically connected with each of said valves in controlling relation and enabling the operator to control the same at will from a point remote from said valves and said pump, and timer mechanism electrically connected with said air solenoid valve in actuating relation for causing said air valve to open briefly at regularly spaced intervals to inject air into the flow of water through said first conduit means at spaced intervals while said water valve is open and thereby create surging and churning in said tube to ehance the cleansing operation.

2. In a cleaning apparatus, a positive action piston type pump having a liquid inlet and a liquid discharge outlet, mechanism for operating said pump and causing the same to take liquid thereinto at its inlet and to discharge such liquid through its discharge outlet, flow directing means connected to said pump outlet for directing the flow of such liquid against a surface to be cleaned, said flow directing means including a movable, flexible tube through which the fluid flows and having a discharge outlet, conduit means connected with said pump inlet and having an intake adapted to be connected to a source of liquid, a solenoid valve interposed within said conduit means between its intake and said pump inlet and cutting off the flow of such liquid from said intake to said pump when in closed position, a solenoid restrictor valve interposed within said conduit means between its intake and said pump inlet for restricting but not closing off the flow of liquid from said intake to said pump when in closed position, second conduit means adapted to be connected to a source of liquid cleaner and connected in fluid communicating relation with said first mentioned conduit means between its intake and the point at which it is connected to said pump, a solenoid valve interposed within said second conduit means for permitting said pump to draw cleaner into said first mentioned conduit means when in open position and said first mentioned valve is open and said restrictor valve is in closed position, a source of compressed air, third conduit means connected with said first mentioned conduit means in fluid communicating relation and having an inlet connected with said source of compressed air, a solenoid valve interposed within said third mentioned conduit means for permitting compressed air when in open position to be injected into the flow of liquid passing through said flow directing means when said first mentioned valve and said restrictor valve are in open positions, centralized portable switch means carried by said flow directing means adjacent its discharge outlet and disposed remote from said pump and movable with said flow directing means, said switch means being electrically connected with each of said valves in controlling relation and enabling the operator to control said valves at will and from a point remote from said pump and said valve, and timing mechanism connected with said air solenoid valve in actuating relation to cause said air valve to open briefly at regular spaced intervals to inject air briefly into the flow of liquid.

3. In a cleaning apparatus a pump having a liquid inlet and a liquid discharge outlet, mechanism for operating said pump to cause the same to take liquid thereinto at its inlet and to discharge such liquid through its discharge outlet, flow directing means connected to said pump outlet for directing the flow of such liquid against a surface to be cleaned, said flow directing means including a movable flexible tube through which the fluid flows and having a discharge outlet, conduit means connected with said pump inlet and having an intake adapted to be connected to a source of liquid, a solenoid valve interposed within said conduit means between its intake and said pump inlet for controlling the flow of such liquid from said intake to said pump, a source of compressed air, conduit means connecting said compressed air source with one of said two means, a valve interposed within said second mentioned conduit means for permitting compressed air when the valves are in open position to be injected into one of said first mentioned two means to cause surging and churning within the flow of such liquid through said flow directing means, centralized portable switch means carried by said tube adjacent its discharge outlet and disposed remote from said pump and said valves and movable with the discharge outlet of said tube, said switch means being electrically connected with each of said valves in controlling relation and enabling the operator to control them at will from a point remote therefrom and remote from said pump, and timing mechanism connected with said air solenoid valve in actuating relation for causing said air valve to open briefly at regular intervals to inject air into the flow of water through said first conduit means at regular brief intervals to create surging and churning within the flow of such liquid through said flow directing means.

4. In a cleaning apparatus, a pump having a liquid inlet and a liquid discharge outlet, means for operating said pump to cause the same to take liquid thereinto at its inlet and to discharge such liquid through its discharge outlet, flow directing means connected to said pump outlet for directing the flow of such liquid against a surface to be cleaned, conduit means connected with said pump inlet and having an intake adapted to be connected to a source of liquid, a restrictor valve interposed within said conduit means between its intake and said pump inlet for restricting but not closing off the flow of liquid from said intake to said pump when in closed position, second conduit means connected in fluid-communicating relation with said first mentioned conduit means at a point between said restrictor valve and said pump and having an inlet adapted to be connected to a source of liquid cleaner, and a valve interposed within said second mentioned conduit means between its inlet and the point at which it is connected to said first mentioned conduit means for permitting said pump to draw cleaner into said first mentioned conduit means when in open position and said restrictor valve is in closed position.

5. The structure defined in claim 4 wherein said restrictor valve is electrically operated, and valve actuating means carried by said flow directing means and electrically connected with said restrictor valve for actuation of said restrictor valve to permit the latter to be controlled by the operator as desired.

6. The structure defined in claim 4 wherein said flow directing means has a discharge outlet and said restrictor valve is electrically operated, and switch means carried by said flow directing means adjacent its discharge outlet and being electrically connected with said restrictor valve in controlling relation and enabling the operator to control said restrictor valve at will.

7. The structure defined in claim 4 wherein said flow directing means includes a flexible tube through which such fluid flows and has a discharge outlet and said valves are solenoid valves, and switch means carried by said flow directing means immediately adjacent its discharge outlet and remote from said pump, said switch means being electrically connected with said solenoid valves in controlling relation and enabling the operator to open and close said valves separately or simultaneously at will from a location remote from said pump.

8. In a cleaning apparatus, a pump having a liquid inlet and a liquid discharge outlet, means for operating said pump to cause the same to take liquid thereinto at its inlet and to discharge such liquid through its discharge outlet, flow directing means connected to said pump outlet for directing the flow of such liquid against a surface to be cleaned, conduit means connected to said pump inlet and having an intake adapted to be connected to a source of liquid, a valve interposed within said conduit means between its intake and said pump inlet for cutting off the flow of such liquid from said intake to said pump when in closed position, a restrictor valve interposed within said conduit means between its intake and said pump inlet for restricting but not closing off the flow of liquid from said intake to said pump when in closed position, second conduit means connected in fluid-communicating relation with said first mentioned conduit means at a point between said restrictor valve and said pump and having an inlet adapted to be connected to a source of liquid cleaner, and a valve interposed within said second mentioned conduit means between its inlet and the point at which it is connected to said first mentioned conduit means for permitting said pump to draw cleaner into said first mentioned conduit means when in open position and said first mentioned valve is open and said restrictor valve is in closed position.

9. The structure defined in claim 8 wherein said valves are electrically operated, and valve actuating means carried by said flow directing means adjacent its discharge outlet and being electrically connected with said valves in controlling relation and enabling an operator of said flow directing means of the apparatus to operate said valves at will.

10. The structure defined in claim 8 wherein said valves are electrically operated and said flow directing means has a discharge outlet, and switch means carried by said flow directing means adjacent its discharge outlet and being electrically connected with said valves in controlling relation and enabling an operator of said flow directing means of the apparatus to operate said valves at will.

11. The structure defined in claim 8 wherein said flow directing means includes a flexible tube through which said fluid flows and has a discharge outlet and said valves are solenoid valves, and switch means carried by said flow directing means adjacent its discharge outlet and remote from said pump and movable with said flow directing means, said switch means being electrically connected with each of said valves in controlling relation and enabling the operator to control said valves at will from a location remote from said pump and at the point of application of the flow against the surface to be cleaned.

12. In a cleaning apparatus, a pump having a liquid inlet and a liquid discharge outlet, mechanism for operating said pump to cause the same to take liquid thereinto at its inlet and to discharge such liquid through its discharge outlet, flow directing means connected to said pump outlet for directing the flow of such liquid against a surface to be cleaned, conduit means connected with said pump inlet and having an intake adapted to be connected to a source of liquid, a valve interposed within said conduit means between its intake and said pump inlet for controlling the flow of such liquid from said intake to said pump, a source of compressed air, conduit means connecting said compressed air source in fluid communicating relation with said flow directing means, and a valve interposed within said second mentioned conduit means for permitting compressed air when said valves are in open positions to be injected into said flow directing means to cause surging and churning within the flow of such liquid through said flow directing means.

13. The structure defined in claim 12 wherein said valves are electrically operated, and valve actuating means carried by said flow directing means and being electrically connected with said valves in controlling relation and enabling an operator of said flow directing means to operate each of said valves at will.

14. The structure defined in claim 12 wherein said valves are electrically operated and said flow directing means has a discharge outlet, and switch means carried by said flow directing means adjacent its discharge outlet and being electrically connected with said valves in controlling relation and enabling an operator of said flow directing means of the apparatus to operate said valves at will.

15. The structure defined in claim 12 wherein said flow directing means includes a movable flexible tube through which such fluid flows and has a discharge outlet and said valves are solenoid valves, and centralized portable switch means carried by said flow directing means adjacent its discharge outlet and remote from said pump and movable with said flow directing means, said switch means being electrically connected with each of said valves in controlling relation and enabling the operator to control said valves at will from a location remote from said pump and at the point of application of the flow against the surface to be cleaned.

16. In a cleaning apparatus, a positive action piston type pump having a liquid inlet and a liquid discharge outlet, mechanism for operating said pump and causing the same to take liquid thereinto at its inlet and to discharge such liquid through its discharge outlet, flow directing means connected to said pump outlet for directing the flow of such liquid against a surface to be cleaned, conduit means connected with said pump inlet and having an intake adapted to be connected to a source of liquid, a valve interposed within said conduit means between its intake and said pump inlet and cutting off the flow of such liquid from said intake to said pump when in closed position, a restrictor valve interposed within said conduit means between its intake and said pump inlet for restricting but not closing off the flow of liquid from said intake to said pump when in closed position, second conduit means connected in fluid communicating relation with said first mentioned conduit means at a point between said restrictor valve and said pump and having an inlet adapted to be connected to a source of liquid cleaner, a valve interposed within said second mentioned conduit means between its inlet and the point at which it is connected to said first mentioned conduit means for permitting said pump to draw cleaner into said first mentioned conduit means when in open position and said first mentioned valve is open and said restrictor valve is in closed position, a source of compressed air, third conduit means connected with said first mentioned conduit means in fluid communicating relation and having an inlet connected with said source of compressed air, and a valve interposed within said third mentioned conduit means for permitting compressed air when in open position to be injected into the flow of liquid passing through said flow directing means when said first mentioned valve and said restrictor valve are in open position.

17. The structure defined in claim 16 wherein said valves are each electrically operated, and valve actuating means carried by said flow directing means remote from said pump and said valves and being electrically connected with said valves in controlling relation and enabling an operator of said flow directing means to operate each of said valves at will.

18. The structure defined in claim 16 wherein each of said valves is electrically operated and said fluid directing means has a discharge outlet and is movable relative to the rest of the apparatus, and switch means carried by said flow directing means adjacent its discharge outlet and being electrically connected with said valves in controlling relation and enabling an operator of said flow directing means of the apparatus to operate said valves at will from a point remote from said pump and said valves.

19. The structure defined in claim 16 wherein said flow directing means includes a movable flexible tube through which said fluid flows and has a discharge outlet and said valves are solenoid valves, and centralized portable switch means carried by said flow directing means adjacent its discharge outlet and remote from said pump and movable with said flow directing means, said switch means being electrically connected with each of said valves in controlling relation and enabling the operator to control said valves at will from a location remote from said pump and at the point of application of the flow against the surface to be cleaned.

References Cited in the file of this patent

UNITED STATES PATENTS

| | | |
|---|---|---|
| 2,000,367 | Williamson et al. | May 7, 1935 |
| 2,571,575 | Holmes | Oct. 16, 1951 |
| 2,606,069 | Hutchins et al. | Aug. 5, 1952 |
| 2,861,838 | Wyatt et al. | Nov. 25, 1958 |
| 2,919,070 | Arant | Dec. 29, 1959 |
| 2,943,797 | Nielson | July 5, 1960 |

UNITED STATES PATENT OFFICE
CERTIFICATE OF CORRECTION

Patent No. 3,058,668            October 16, 1962

Oren B. Harmes et al.

It is hereby certified that error appears in the above numbered patent requiring correction and that the said Letters Patent should read as corrected below.

In the grant, lines 1 and 11, and in the heading to the printed specification, line 3, for "John H. Therlkeld", each occurrence, read -- John H. Threlkeld --.

Signed and sealed this 27th day of August 1963.

(SEAL)
Attest:

ERNEST W. SWIDER
Attesting Officer

DAVID L. LADD
Commissioner of Patents